(12) United States Patent
Shotey et al.

(10) Patent No.: US 7,674,974 B1
(45) Date of Patent: Mar. 9, 2010

(54) WEATHERPROOF SIDING FLANGE

(75) Inventors: Marcus J. Shotey, Scottsdale, AZ (US);
Michael J. Shotey, Las Vegas, NV (US);
Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 99 days.

(21) Appl. No.: 11/684,070

(22) Filed: Mar. 9, 2007

Related U.S. Application Data

(60) Provisional application No. 60/781,505, filed on Mar. 9, 2006, provisional application No. 60/744,287, filed on Apr. 5, 2006.

(51) Int. Cl.
*H01H 9/02* (2006.01)

(52) U.S. Cl. .................. 174/53; 174/480; 174/481; 174/58; 174/57; 220/3.2; 220/3.3; 220/4.02

(58) Field of Classification Search .......... 174/480, 174/481, 50, 53, 57, 58, 503, 502, 61, 62, 174/66, 67; 220/3.2–3.9, 4.02; 248/906, 248/343; D13/152; 439/535
See application file for complete search history.

(56) References Cited

U.S. PATENT DOCUMENTS

| | | | | |
|---|---|---|---|---|
| 4,673,097 A | * | 6/1987 | Schuldt | 220/3.2 |
| 4,988,832 A | * | 1/1991 | Shotey | 174/53 |
| 5,287,665 A | * | 2/1994 | Rath, Jr. | 220/3.3 |
| 5,763,831 A | | 6/1998 | Shotey et al. | |
| 6,395,984 B1 | | 5/2002 | Gilleran | |
| 6,642,453 B2 | | 11/2003 | Shotey et al. | |
| 6,649,835 B2 | * | 11/2003 | Gilleran | 174/58 |
| 6,894,223 B1 | | 5/2005 | Shotey et al. | |
| 6,951,983 B1 | * | 10/2005 | Gretz | 174/58 |
| 6,953,890 B2 | * | 10/2005 | Koessler | 174/50 |
| 7,005,578 B2 | * | 2/2006 | Gretz | 174/58 |
| 7,087,837 B1 | * | 8/2006 | Gretz | 174/58 |
| 7,115,820 B1 | * | 10/2006 | Gretz | 174/481 |
| 7,151,219 B1 | * | 12/2006 | Gretz | 174/58 |
| 7,176,377 B1 | | 2/2007 | Gretz | |

* cited by examiner

*Primary Examiner*—Angel R Estrada
(74) *Attorney, Agent, or Firm*—Booth Udall, PLC

(57) ABSTRACT

A plurality of siding flange implementations comprising weatherproof siding flanges combined with an electrical wall box or a while-in-use electrical cover. The siding flange may be integrally formed with the electrical wall box or removably coupled to the electrical wall box, for example, on an inside surface of the box. The siding flange may comprise weight reducing pockets separated by strengthening ribs. The siding flange may also comprise a lip extending forward of the siding flange and having one or more grooves therein. The grooves may allow portions of the lip to be removed to adapt to varying siding material thickness.

18 Claims, 5 Drawing Sheets

WEATHERPROOF SIDING FLANGE

CROSS REFERENCE TO RELATED APPLICATIONS

This document claims the benefit of the filing date of U.S. Provisional Patent Application 60/781,505, entitled "Weatherproof Siding Flange and Electrical Box" to Shotey et al. which was filed on Mar. 9, 2006, the contents of which are hereby incorporated in the present application in their entirety. This document also claims the benefit of the filing date of U.S. Provisional Patent Application 60/744,287, entitled "Combined Weatherproof Siding Flange and Electrical Box and Adaptable Weatherproof Siding Flange" to Shotey et al. which was filed on Apr. 5, 2006, the contents of which are hereby incorporated in the present application in their entirety.

BACKGROUND

1. Technical Field

Aspects of this document relate generally to weatherproof siding flanges for resisting water entry into an electrical box mounted within a wall. The various implementations may be manufactured using conventional procedures known to those of ordinary skill in the art as added to and improved upon through the procedures described here.

2. Background Art

Weatherproof siding flanges, such as that shown and described in U.S. Pat. No. 6,395,984 to Gilleran (issued May 28, 2002), the disclosure of which is hereby incorporated herein by reference, conventionally comprise rubber or plastic, waterproof material formed to include an opening for an electrical box. The opening conventionally fits around the electrical box that extends from the wall and the siding flange includes a waterproof plate that extends in a substantially planar manner out from the opening. The siding material, whether it is aluminum, wood, stucco, brick, or other known siding material, is placed over the siding flange leaving the opening unobstructed to grant access to the electrical box.

SUMMARY

Siding flange implementations relate to various aspects of combinations of siding flanges with either an electrical wall box or a while-in-use weatherproof outlet cover. Aspects relate generally to reducing weight of the siding flange, adapting the siding flange combination to varying siding depths and wall installations, providing indications of thicknesses, and allowing for removable attachment of the siding flange to an electrical wall box.

In a first aspect, a combination weatherproof siding flange and electrical wall box comprises an electrical wall box having a back wall and at least four side walls extending from the back wall, the electrical wall box having an opening at a front of the electrical wall box, and a siding flange extending laterally away from each of the at least four side walls, the siding flange having an opening at a center of the siding flange corresponding to the opening of the front of the electrical wall box, wherein the siding flange comprises a plurality of weight reduction pockets in its body, each weight reduction pocket separated from an adjacent weight reduction pocket by a strengthening rib, the weight reduction pockets having a depth not more than 70% of the thickness of the strengthening ribs. In most implementations, the depth of the weight reduction pockets is between 40-50% of the thickness of the strengthening ribs.

In particular implementations relating to the first aspect, the siding flange is removably coupled to the electrical wall box. In more particular implementations, the siding flange comprises at least two flexible clips extending rearward of the siding flange into the opening at the front of the electrical wall box and removably coupling with at least two of the four side walls inside the opening. In still more particular implementations, the flexible clips comprise clip nodes configured to couple with corresponding recesses on an inside of the side walls of the electrical wall box. In still yet more particular implementations the corresponding recesses comprise a plurality of corresponding recesses on the inside of at least one of the at least two side walls, the plurality of recesses on each wall being spaced at regular intervals.

In other particular implementations relating to the first aspect, the siding flange is formed integrally with the electrical wall box to form a unitary member. In yet other particular implementations relating to the first aspect, the flange comprises a flange lip extending forward of the siding flange. In some implementations, the flange lip comprises at least one groove therein defining a removable lip portion. In more particular implementations, the flange further comprises a depth indicator associated with the flange lip.

In a second aspect, a combination weatherproof siding flange and electrical wall box comprises an electrical wall box having a back wall and at least four side walls extending from the back wall, the electrical wall box having an opening at a front of the electrical wall box and a siding flange removably coupled to an inside surface of the electrical wall box. In particular implementations relating to the second aspect, the siding flange comprises at least two flexible clips extending rearward of the siding flange into the opening at the front of the electrical wall box and removably coupling with the inside surface of the electrical wall box on at least two of the four side walls. In other particular implementations, the flexible clips comprise clip nodes configured to couple with corresponding recesses on the inside surface of the electrical wall box. In still other particular implementations, the corresponding recesses comprise a plurality of corresponding recesses on the inside surface of the electrical wall box, the plurality of recesses being spaced at regular intervals.

In other particular implementations relating to the second aspect, the siding flange further comprises a plurality of weight reduction pockets in its body, each weight reduction pocket separated from an adjacent weight reduction pocket by a strengthening rib, the weight reduction pockets having a thickness not more than 70% of the thickness of the strengthening ribs. In most implementations, the depth of the weight reduction pockets is between 40-50% of the thickness of the strengthening ribs.

In yet other particular implementations relating to the second aspect, the flange comprises a flange lip extending forward of the siding flange. In some implementations, the flange lip comprises at least one groove therein defining a removable lip portion. In more particular implementations, the flange further comprises a depth indicator associated with the flange lip.

In a third aspect, a combination weatherproof siding flange and electrical wall box comprise a flange lip extending forward of the siding flange. In some implementations, the flange lip comprises at least one groove therein defining a removable lip portion. In more particular implementations, the flange further comprises a depth indicator associated with the flange lip.

In a fourth aspect, a combination weatherproof siding flange and weatherproof outlet cover comprises a while-in-use electrical outlet cover comprising a base hingedly coupled to a lid and a siding flange formed integrally with the base and extending laterally away from the base. In particular implementations, the siding flange is co-planar with a rear side of the base. In other particular implementations, the base extends behind the siding flange such that the siding flange extends laterally away from the base at a point forward of the rear side of the base.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended siding flange and electrical cover or siding flange and electrical box, and/or assembly procedures for a siding flange and electrical cover or siding flange and electrical box will become apparent for use with the various implementations illustrated from this disclosure. Accordingly, for example, although particular siding flange and electrical cover implementations and siding flange and electrical box implementations are disclosed, such implementations and implementing components may comprise any shape, size, style, type, model, version, measurement, concentration, material, quantity, and/or the like as is known in the art for such siding flange and electrical cover or siding flange and electrical box and implementing components, consistent with the intended operation of a siding flange and electrical cover or a siding flange and electrical box The present disclosure includes primarily five implementations of a weatherproof siding flange. Those of ordinary skill in the art will understand that the principles and aspects of each particular implementation of a siding flange disclosed herein may be applied to the other siding flanges disclosed.

Figure 1:
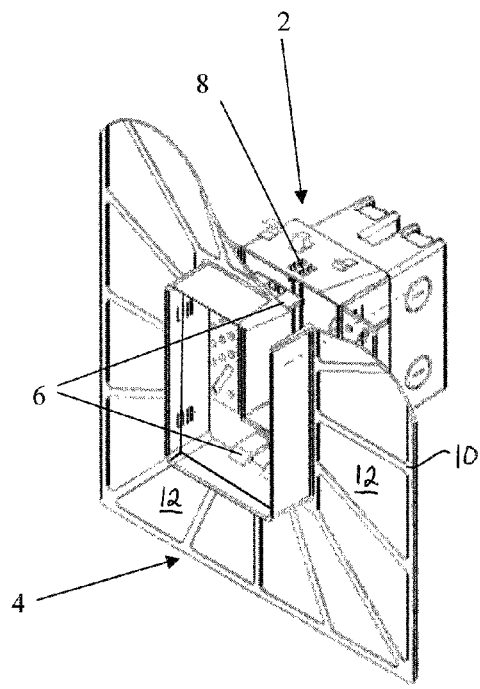
FIG. 1 is a perspective cutaway view of a first implementation of an electrical box and a weatherproof siding flange combination.

The first implementation of a siding flange is illustrated in FIGS. 1-5. FIG. 1 illustrates a siding flange configured with rear-extending clips for coupling to an electrical box. The electrical box shown as an example in this disclosure is a recessed electrical outlet box that may be nailed or otherwise attached to a wall stud. The flange configurations disclosed herein may equally be applied to other electrical box configurations and designs, or may be adapted or configured for use with other electrical box configurations by those of ordinary skill in the art.

FIG. 1 is a perspective cutaway view of an electrical box 2 and a weatherproof siding flange 4 aligned but separated from each other. Electrical box clips 6 extend rearward of the flange 4 for coupling with a corresponding structure of the electrical box 2. Although this particular implementation includes the clips 6 extending from within an opening in the flange 4 to couple with the corresponding electrical box 2 recesses 8 from within the electrical box 2, it should be understood that other implementations may include clips extending from other portions of the flange 4 and coupling to other places or structures on the electrical box 2. Examples include, but are not limited to extending the back surface of the flange 4, coupling to a structure on an outside of the electrical box 2, and coupling to a back wall of the electrical box 2. The clips 6 for the implementation of FIG. 1 are the only portion of the flange 4 that extends into the box. In this implementation, the recesses 8 into which the electrical box clips 6 extend from the inside of the electrical box 2 also extend through the wall of the electrical box 2, though extension completely through the wall is not required provided the recess 8 is sufficiently deep to receive clip nodes 14 (FIG. 2).

The flange plate member 10 comprises strengthening ribs 11 and weight reduction pockets 12 therein formed as recesses in the flange plate to reduce the material used for the flange plate member 10 while retaining the strength and waterproof attributes desired. The weight reduction pockets have a depth not more than 70% of the thickness of the flange plate member 10 to maintain structural strength, but in most implementations have a depth closer to 40-50% of the thickness.

Figure 2:
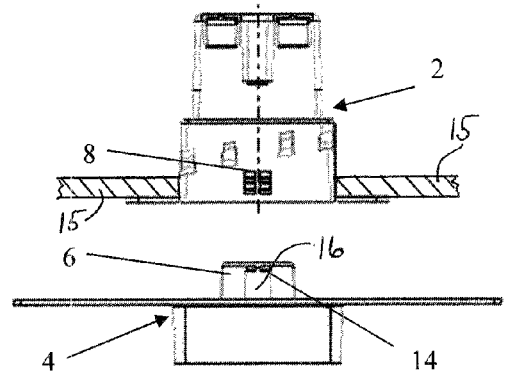
FIG. 2 is a top view of the first implementation illustrated in FIG. 1.

FIG. 2 is a top view of the electrical box 2 and a weatherproof siding flange 4 illustrated in FIG. 1 shown mounted in a wall to wall board 15. The electrical box clips 6 may be made flexible to allow for flexure while being inserted into the electrical box 2 and to provide continued force to urge the electrical box clip nodes 14 toward the recesses 8. The recesses 8 may be spaced at intervals within the electrical box 2 so that when the flange's electrical box clips 6 are inserted, they are held in place as the flange 4 is pressed firmly against the wall regardless of variances in box installation and wall surface thickness. By having the recesses 8 spaced at intervals within the electrical box 2, the flange 4 can always be assured of having a tight fit against the wall.

Figure 3:
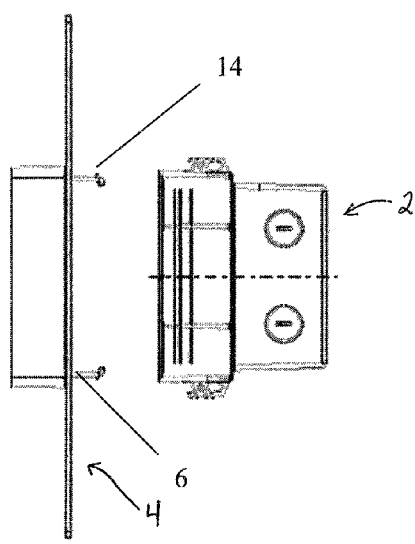
FIG. 3 is a side view of the first implementation illustrated in FIG. 1.
Figure 4:
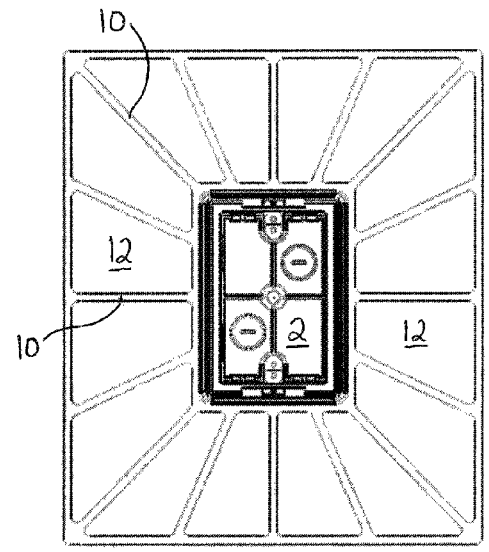
FIG. 4 is a front view of the first implementation illustrated in FIG. 1.
Figure 5:
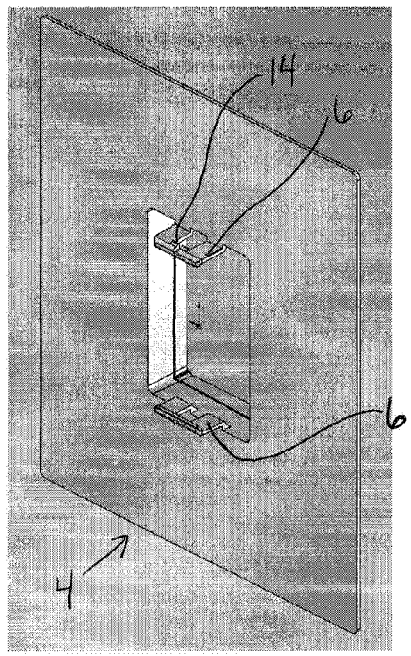
FIG. 5 is a rear perspective view of the flange illustrated illustrated in FIG. 1.
Figure 6:
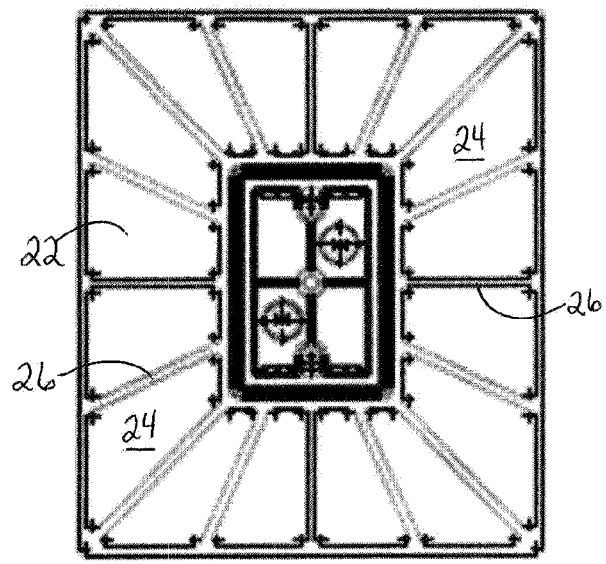
FIG. 6 is a front view of a second implementation of an electrical box and weatherproof siding flange combination.
Figure 7:
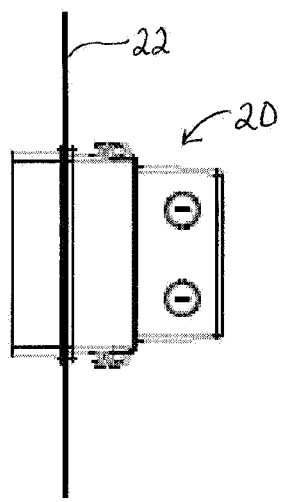
FIG. 7 is a side view of the second implementation illustrated in FIG. 6.
Figure 8:
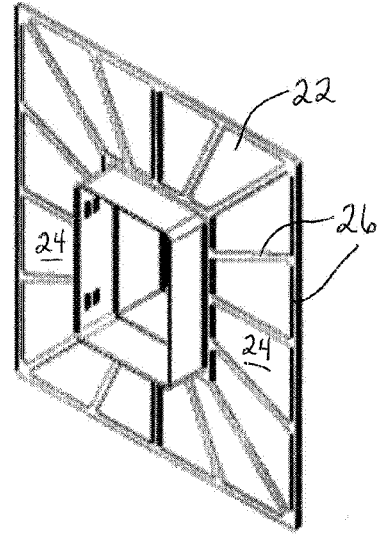
FIG. 8 is a front perspective view of the second implementation illustrated in FIG. 6.
Figure 9:
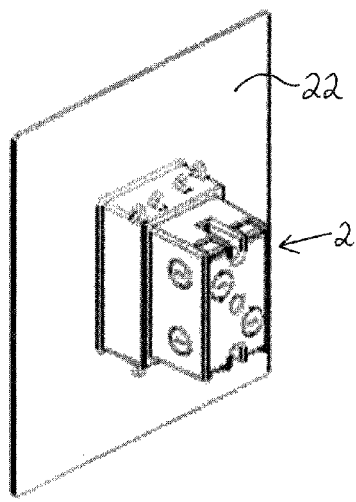
FIG. 9 is a rear perspective view of the second implementation illustrated in FIG. 6.

FIGS. 3 and 4 are, respectively, a right side view and a front view of the electrical box and a weatherproof siding flange shown in FIGS. 1 and 2. FIG. 5 is a rear perspective view of the flange 4 illustrated in FIGS. 1-4, illustrating the electrical box clips 6. Although the implementations of the waterproof siding flange is not limited to a particular size and may extend various dimensions depending upon the particular application for the flange, one particular implementation has a flange 4 width of 10.25 inches and a height of 12 inches.

In addition to the specific design for attachment of the siding flange to the electrical box using clips as shown above, many other methods may be used to allow the flange to associate with the electrical box from the inside of the electrical box. For example, the clips may be used but positioned to attach to one or more sides of the electrical box rather than the top and bottom. The clips may be used and have only one fixed recess position. Other attachment modes may be used between the siding flange and the electrical outlet box such as protrusions on the back of the flange plate that mate or otherwise interface with the electrical box (such as with the attachment flanges on the recessed electrical box shown here), or a component may extend from within the opening to couple with a screw in the mounting screw hole or other screw hole of the electrical outlet box. Although it was mentioned briefly above, the electrical box may be any form and/or shape of electrical box for which additional water resistance is desirable.

One important novel aspect of the siding flange and electrical box of the first implementation disclosed is that the flange couples to the inside of the box rather than the outside of the electrical box. Any method or mode of connection to the inside is sufficient so long as it does not significantly interfere with the placement of an electrical device within the electrical box. Because the electrical devices typically placed within an electrical box are smaller than the opening, coupling the flange clips to an inside wall of the electrical box is generally not a problem and those of ordinary skill in the art will readily be able to adapt a particular flange connector, and possibly even adapt conventional electrical box designs for receiving the flange connector, without interfering with the placement of an electrical device in the electrical box. In some particular implementations, it is contemplated that the clips 6 may be formed as a continuous, or semi-continuous, lip that extends into the electrical box and holds the siding flange in place by friction rather than or in addition to a mechanical hold caused by the clip nodes 14.

Installation of the siding flange and electrical box may be done by attaching the electrical box to the wall as is conventionally done, placing the wall board, then attaching the siding flange by pressing the clips into the opening of the electrical box until the siding flange is seated against the wall board and the clip nodes are seated within the recesses. Removal may be achieved, if necessary, by prying either the top or bottom clips away from the side of the electrical box to remove the clip nodes from the recess, and pulling the siding flange away from the wall. As shown in FIG. 2, the flange clip 6 may include an opening 16 therein to assist in removal. For example, removal of the flange clip 6 from the electrical box recess 8 may be accomplished by inserting a slot screwdriver blade or other narrow tool through the clip opening 16 and between the clip nodes 14 and the electrical box recesses 8 to allow the flange 4 to uncouple from the electrical box 4.

A second implementation of an electrical box 20 having a weatherproof siding flange 22 is illustrated in FIGS. 6-9. Different from the implementation of FIGS. 1-5, in this particular implementation, the flange 22 and electrical outlet box 20 are formed as a unitary member. In other words, the electrical box 20 is molded or otherwise formed to include a weatherproof siding flange 22 thereon as a unitary piece. While this approach may complicate the molding process some, it provides significantly increased waterproofing resistance to moisture because there are no openings or gaps through which water may seep at the junction between the flange 22 and the electrical box 20. FIGS. 6-9 illustrate, front (FIG. 6), side (FIG. 7), front perspective (FIG. 8) and rear perspective (FIG. 9) views of a waterproof siding flange 20 and electrical box 22 formed as a unitary piece.

Similar to the implementation of FIGS. 1-5, the particular implementation illustrated in FIGS. 6-9 includes weight reduction pockets 24 and strengthening ribs 26 on the flange 22 to reduce the material used for the flange plate member while retaining the strength and weatherproofing attributes desired. The weight reduction pockets have a depth of not more than 70% of the thickness of the flange plate member to maintain structural strength, but in most implementations have a depth closer to 40-50% of the thickness.

Figure 10:
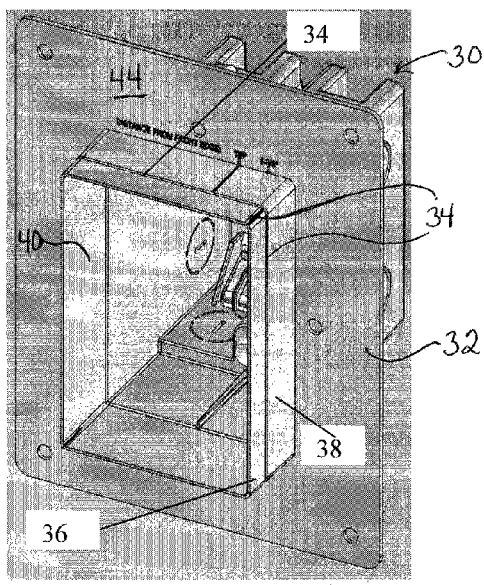
FIG. 10 is a front perspective view of a third implementation of an electrical box and weatherproof siding flange combination.

A third implementation of a siding flange is shown in FIGS. 10-13. FIG. 10 illustrates a siding flange configured with an adaptable or adjustable front lip that is adaptable to differing wall siding depths. The electrical box shown as an example in this implementation is a recessed electrical outlet box coupled to a weatherproof siding flange. The combination may be formed as one piece using conventional plastics manufacturing techniques or formed separately and coupled together (by non-limiting example, such as was described with reference to the implementations described with reference to the implementations described in relation to FIGS. 1-5). In either configuration, the electrical box may be configured to couple directly to a wall stud or be attached directly to the wall using the support of the flange. The implementations disclosed herein may equally be applied to other electrical box configurations and designs, or may be adapted or configured for use with other electrical box configurations by those of ordinary skill in the art. Furthermore, although particular implementations may reference a weatherproof siding flange, the principles of the adjustable front lip may be applied to any siding flange design. Additionally, the inclusion of a nail, screw or other mounting structure through the flange plate does not remove any particular siding flange from the classification of being a weatherproof siding flange.

FIG. 10 is a perspective view of an electrical box 30 and a weatherproof siding flange 32 with grooves 34 that allow a first portion 36 of a siding flange lip 40 to be removed from the second portion 38 of the lip and allows for adjustment of the depth of the lip 40 for various siding styles, such as brick or stucco. Lip grooves 34 may be formed on the inside and/or the outside of the lip 40 using conventional plastics molding techniques for molding a break-away plastic portion. Examples of other products that employ similar break-away sections are found in patents owned by TayMac, Inc. and many patents invented by Michael Shotey et al. of Arizona such as U.S. Pat. Nos. 5,763,831 (issued Jun. 9, 1998) and 6,642,453 (issued Nov. 4, 2003), the relevant disclosures of which are hereby incorporated herein by reference. The removable lip portion aspect of this particular implementation may also be incorporated into the implementations shown in FIGS. 1-9.

Figure 11:
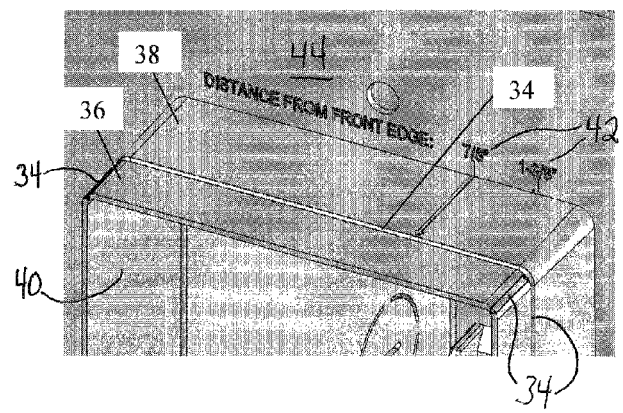
FIG. 11 is a close-up view of the grooves and removable lip portion of the third implementation illustrated in FIG. 10.

FIG. 11 is a close-up view of sliding flange lip 40 comprising grooves 34 and break-away portion 36. As shown in this Figure, distance indicators 42 may be provided to indicate the depth of the lip portion, or alternatively, the distance from the flange body 44 to the front edge, for each section for each lip portion 36 and 38. This indication may assist installers in selecting an appropriate depth for a particular siding. It will be understood by those of ordinary skill in the art that any number of varying lip portions, groove positions and multiple grooves may be included to make the siding flange unit adaptable to any groove depth. Additionally, regular grooves may be included at regular intervals to adapt to non-standard siding depths as well. Grooves for non-standard depths may be included on the inside while grooves for standard depths are included on the outside, or any combination thereof.

Figure 12:
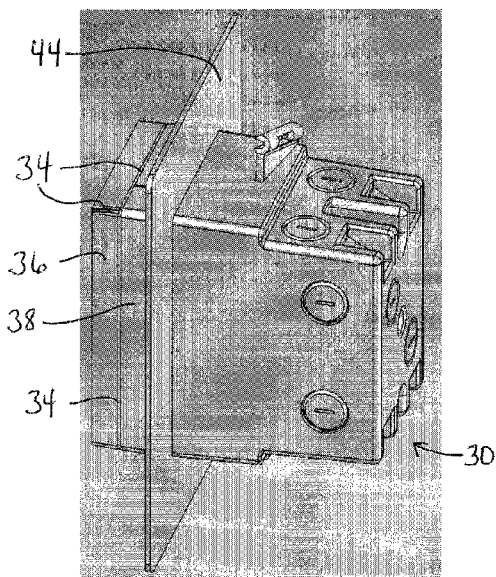
FIG. 12 is a rear perspective view of the third implementation illustrated in FIG. 10.

FIG. 12 is a rear perspective view of the electrical box and a weatherproof siding flange illustrated in FIGS. 10-11.

FIGS. 13-18 illustrate various implementations of a combination weatherproof siding flange and a while-in-use ("WIU") outlet cover. WIU outlet covers are well known in the industry. Examples are shown and described in U.S. Pat. Nos. 5,763,831 and 6,894,223, the disclosures of which are hereby incorporated herein by reference.

Figure 13:
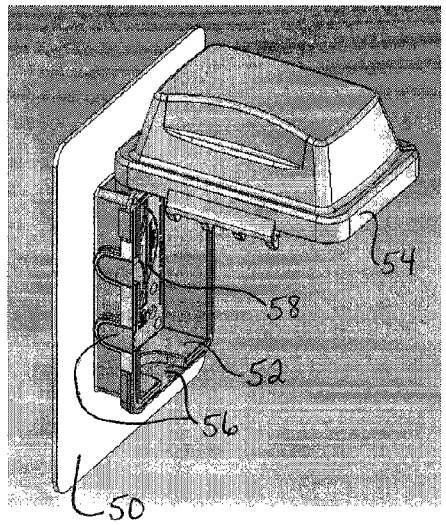
FIG. 13 is a front perspective view of a first implementation of a siding flange and while-in-use cover combination.

FIG. 13 is a front perspective view of an implementation of a weatherproof siding flange 50 incorporated into the base 52 of a WIU cover. The siding flange 50, sometimes called "flashing" in the art, is coupled to or formed as part of the base and is on the plane of the base. The WIU cover in this implementation comprises a lid 54 hingedly coupled to the base 52. Alternatively, the lid 54 may be coupled to the base 52 in any other way known in the art to enable protected receptacle use. Several cord escape knock-out regions 56 are included in the base 52 of this implementation as well. The base of this particular implementation, though it is not required, comprises removable tabs 58 formed integrally with the base 52. The removable tabs may be configured to enable adaptation of the base for use with differently configured outlets or switches. Alternatively, or additionally, other particular implementations may comprise separate adapter plates, such as is shown and described in U.S. Pat. No. 6,642,453 to Shotey et al., the disclosure of which is hereby incorporated herein by reference.

Figure 14:
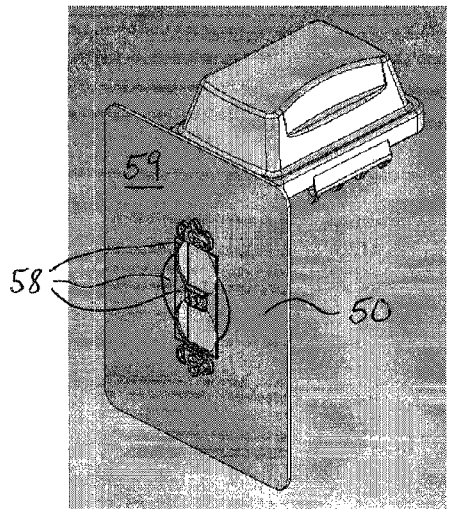
FIG. 14 is a rear perspective view of the implementation illustrated in FIG. 13.
Figure 15:
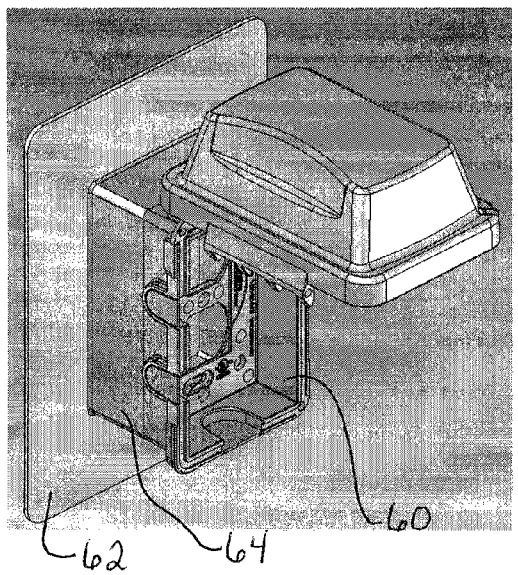
FIG. 15 is a rear perspective view of a second implementation of a siding flange and while-in-use cover combination.
Figure 16:
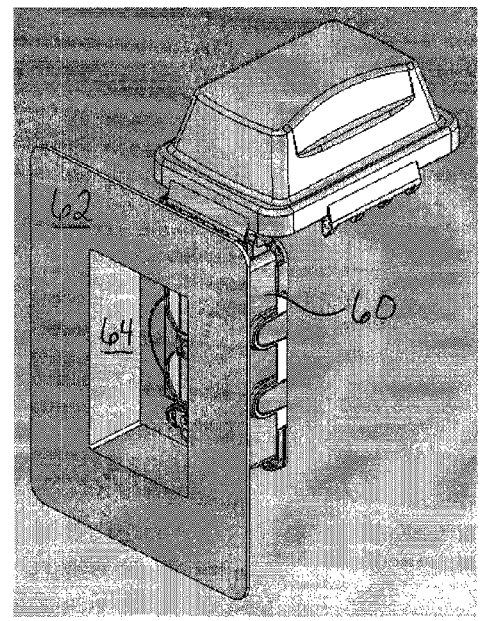
FIG. 16 is a front perspective view of the implementation illustrated in FIG. 15.

FIG. 14 is a perspective view of the weatherproof siding flange combination of FIG. 13. Note that the flange 50 in this particular implementation is part of the base such that the components conventionally formed in the back surface of the WIU base are formed into the back surface 59 of the flange 50. FIGS. 15 and 16 illustrate, respectively, front and rear perspective views of another particular implementation of a WIU cover having a base 60 combined with a weatherproof siding flange 62. In this implementation, the siding flange 62 comprises an extension 64 to adapt the combination for siding material. The specific depth of the extension 64 used will depend on the particular siding material depth for which the combination is intended. Having the base and weatherproof siding flange combined further enhances the weatherproofing ability of the siding flange. Like other implementations shown and described in this disclosure, this weatherproof siding flange 62 with the extension 64 may be formed integrally with the base 60 as a unitary member or may be coupled to the base after formation using appropriately configured clips, adhesive, heat welding or any other method known in the art for coupling two plastic or rubber pieces together.

Figure 17:
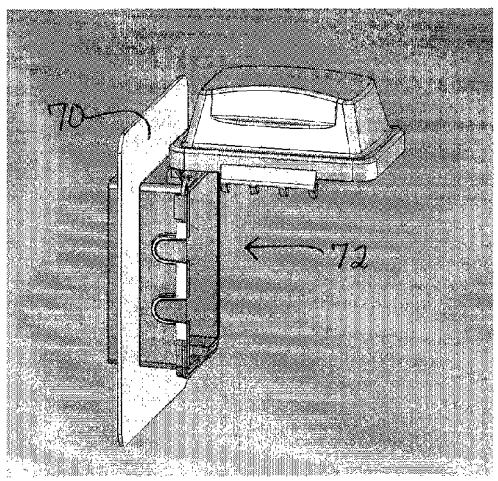
FIG. 17 is a front perspective view of a third implementation of a siding flange and while-in-use cover combination.
Figure 18:
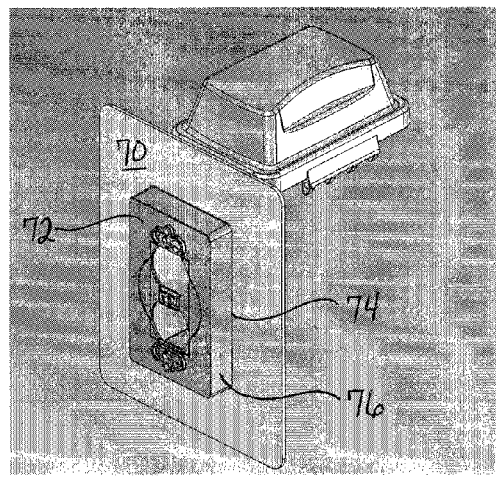
FIG. 18 is a rear perspective view of the implementation illustrated in FIG. 17.

FIGS. 17 and 18 illustrate, respectively, side and rear perspective views of yet another implementation of a weatherproof siding flange 70 combined with a WIU cover base 72. In this particular implementation, the flange 70 is not on the rear plane of the base 72 but instead extends from a point 74 between the rear plane and the front plane of the base 72. As illustrated in FIG. 18, similar to previous implementations described herein, the removable tabs for the base 72 may be included on the bottom plane of the base. In this particular implementation, because the flange 70 extends from the base 72 at a point 74 not on the rear plane of the base 72, in other words including a base extension 76 extending rearward of the flange, the box may be installed on a wall where there is siding behind the flashing that requires an extension to reach the electrical wall box. As should be clear from this illustration, there are no restrictions on how deep the extension 76 behind the plane is required to extend, though some distances will become evident from a review of conventional siding configurations and thicknesses.

Installation of the implementations shown in FIGS. 13-18 may be accomplished by coupling the WIU cover unit to a conventional or otherwise configured electrical wall box as is common in the art. Whether the implementation of FIGS. 13-14, 15-16, 17-18 or some combination of their components and/or aspects is used depends upon the configuration of the siding associated with the wall box. The appropriate configuration may be selected based upon the existing siding and wall box arrangement. Once the WIU cover is coupled to the wall box and receptacle, additional siding material may be added if needed for a particular application.

Similar to the implementations illustrated in FIGS. 1-9, the particular implementations illustrated in FIGS. 10-18 may be adapted to include weight reduction pockets and strengthening ribs on their flanges to reduce the material used for the flange plate member while retaining the strength and weatherproofing attributes desired. Also similar to the implementations illustrated in FIGS. 1-9, the weight reduction pockets have a depth of not more than 70% of the thickness of the flange plate member to maintain structural strength, but in most implementations have a depth closer to 40-50% of the thickness.

The components used for the waterproof siding flange and electrical box assemblies shown herein may be made of conventional materials used to make goods similar to these in the art, such as, by non-limiting example, polyvinylchloride (PVC) or other rigid or flexible rubbers or resins. Those of ordinary skill in the art will readily be able to select appropriate materials and manufacture these products from the disclosures provided herein.

It will be understood that implementations are not limited to the specific components disclosed herein, as virtually any components consistent with the intended operation of a method and/or system implementation may be utilized. Accordingly, for example, although particular components may be disclosed, such components may comprise any shape, size, style, type, model, version, class, grade, measurement, concentration, material, weight, quantity, and/or the like consistent with the intended operation of a method and/or system implementation may be used.

In places where the description above refers to particular implementations of a siding flange it should be readily apparent that a number of modifications may be made without departing from the spirit thereof and that these implementations may be applied to other siding flange designs. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A combination weatherproof siding flange and electrical wall box comprising:

an electrical wall box having a back wall and at least four side walls extending from the back wall, the electrical wall box having an opening at a front of the electrical wall box; and a siding flange extending laterally away from each of the at least four side walls, the siding flange having an opening at a center of the siding flange corresponding to the opening of the front of the electrical wall box;

wherein the siding flange comprises a plurality of weight reduction pockets in its body, each weight reduction pocket separated from an adjacent weight reduction pocket by a strengthening rib, the weight reduction pockets having a depth not more than 70% of a thickness of the strengthening ribs.

2. The combination of claim 1, wherein the siding flange is removably coupled to the electrical wall box.

3. The combination of claim 2, wherein the siding flange comprises at least two flexible clips extending rearward of the siding flange into the opening at the front of the electrical wall box and removably coupling with at least two of the four side walls inside the opening.

4. The combination of claim 3, wherein the flexible clips comprise clip nodes configured to couple with corresponding recesses on an inside of the side walls of the electrical wall box.

5. The combination of claim 4, wherein the corresponding recesses comprise a plurality of corresponding recesses on the inside of at least one of the at least two side walls, the plurality of recesses on each wall being spaced at regular intervals.

6. The combination of claim 1, wherein the siding flange is formed integrally with the electrical wall box to form a unitary member.

7. The combination of claim 1, wherein the flange further comprising a flange lip extending forward of the siding flange.

8. The combination of claim 7, wherein the flange lip comprises at least one groove therein defining a removable lip portion.

9. The combination of claim 8, wherein the flange further comprising a depth indicator associated with the flange lip.

10. A combination weatherproof siding flange and electrical wall box comprising:

an electrical wall box having a back wall and at least four side walls extending from the back wall, the electrical wall box having an opening at a front of the electrical wall box; and a siding flange removably coupled to an inside surface of the electrical wall box;

wherein the siding flange comprises at least one extension extending rearward of the siding flange, the extension extending into the opening at the front of the electrical wall box and contacting at least one of the four side walls on the inside surface of the electrical wall box.

11. The combination of claim 10, wherein the siding flange comprises at least two flexible clips extending rearward of the siding flange into the opening at the front of the electrical wall box and removably coupling with the inside surface of the electrical wall box on at least two of the four side walls.

12. The combination of claim 11, wherein the flexible clips comprise clip nodes configured to couple with corresponding recesses on the inside surface of the electrical wall box.

13. The combination of claim 12, wherein the corresponding recesses comprise a plurality of corresponding recesses on the inside surface of the electrical wall box, the plurality of recesses being spaced at regular intervals.

14. The combination of claim 10, the siding flange further comprising a plurality of weight reduction pockets in its body, each weight reduction pocket separated from an adjacent weight reduction pocket by a strengthening rib, the weight reduction pockets having a depth not more than 70% of the thickness of the strengthening ribs.

15. The combination of claim 10, wherein the flange further comprising a flange lip extending forward of the siding flange.

16. The combination of claim 15, wherein the flange lip comprises at least one groove therein defining a removable lip portion.

17. The combination of claim 16, wherein the flange further comprising a depth indicator associated with the flange lip.

18. A combination weatherproof sliding flange and electrical wall box, comprising:

an electrical wall box having a back wall and at least four side walls extending from the back wall the electrical wall box having an opening at a front of the electrical wall box; and a siding flange removably coupled to an inside surface of the electrical wall box;

wherein the siding flange comprises at least one flexible clip extending rearward of the siding flange into the opening at the front of the electrical wall box and removably coupling with the inside surface of the electrical wall box on at least one of the four side walls.

\* \* \* \* \*